(12) United States Patent
Belyo

(10) Patent No.: US 6,242,889 B1
(45) Date of Patent: Jun. 5, 2001

(54) COMBINATION BATTERY CHARGER/CONTROLLER

(75) Inventor: Steven Belyo, Dripping Springs, TX (US)

(73) Assignee: DAX Industries, Inc., Austin, TX (US)

( * ) Notice: Subject to any disclaimer, the term of this patent is extended or adjusted under 35 U.S.C. 154(b) by 0 days.

(21) Appl. No.: 09/380,931
(22) PCT Filed: Mar. 26, 1998
(86) PCT No.: PCT/US98/06049
§ 371 Date: Sep. 10, 1999
§ 102(e) Date: Sep. 10, 1999
(87) PCT Pub. No.: WO98/45925
PCT Pub. Date: Oct. 15, 1998

Related U.S. Application Data
(60) Provisional application No. 60/041,838, filed on Apr. 9, 1997.

(51) Int. Cl.[7] .......................................... H02J 7/00
(52) U.S. Cl. ............................. 320/128; 320/127
(58) Field of Search ...................... 320/128, 127

(56) References Cited

U.S. PATENT DOCUMENTS

| | | | |
|---|---|---|---|
| 4,629,968 | * | 12/1986 | Butts et al. .............................. 322/29 |
| 5,317,669 | * | 5/1994 | Anderson .............................. 388/829 |
| 5,343,970 | * | 9/1994 | Severinsky ............................ 180/165 |
| 5,528,721 | * | 6/1996 | Searey, II et al. ..................... 388/824 |
| 5,613,569 | | 3/1997 | Sugioka et al. ..................... 180/68.5 |
| 5,631,532 | * | 5/1997 | Azuma et al. ........................ 320/102 |
| 5,734,237 | | 3/1998 | Engel .................................... 318/139 |

* cited by examiner

Primary Examiner—Peter S. Wong
Assistant Examiner—Lawrence Luk
(74) Attorney, Agent, or Firm—Fish & Associates, LLP; Robert D. Fish

(57) ABSTRACT

A battery powered device such as an electric vehicle includes a high power loads such as a drive motor (50), and on-board charging and discharging systems (20) which share significant components such as a pulsing subsystem (40). In particularly preferred embodiments the battery (10) and regenerative braking system (90), where applicable, are selected to operate efficiently with the charging and discharging systems (20).

13 Claims, 1 Drawing Sheet

COMBINATION BATTERY CHARGER/CONTROLLER

This application is a 371 of PCT/US98/06049, filed Mar. 26, 1998, and claims benefit of Provisional application 60/041,838, filed Apr. 9, 1997.

FIELD OF THE INVENTION

The field of the invention is battery powered devices, including battery powered vehicles.

BACKGROUND OF THE INVENTION

Considerable resources have been invested over the last several years in the development of battery powered devices. For many such devices, especially small consumer items such as portable electric shavers and toothbrushes, in which the power storage and delivery requirements are not terribly demanding, the known technologies are quite adequate. For other devices, including portable power tools and computers, golf carts and fork lifts, the demands are such that presently available technologies are relatively satisfactory, but inconvenient. For still other devices such as all-electric automobiles, the demands are such that implementation of commercially acceptable embodiments has been significantly impeded by excessively long charging duration, and limited battery capacity. Thus, there is still a need to improve power storage and delivery in battery powered devices.

There are four systems of especial importance to the overall efficiency of battery powered devices, namely the battery or battery pack, the battery charging system, the battery discharging system and the load. Previously, these systems were almost always developed and implemented independently, resulting in additional inefficiencies even if the underlying systems were themselves relatively efficient. Thus, there is a continuing need to integrate two or more of these systems in ways that improve the overall efficiency.

Batteries

Batteries can generally be divided into two types, those in which the electrolyte is maintained largely in a liquid phase, as exemplified by common lead-acid automobile batteries, and those in which the electrolyte is maintained largely in a solid or semi-solid phase, as exemplified by Nickel-Cadmium (NiCad) batteries. Within each type of battery, there are numerous possible electrolytes and electrode materials available.

Both liquid electrolyte and solid electrolyte batteries suffer from significant drawbacks. Liquid electrolyte batteries tend to leak, and to experience electrolysis involving gas formation at boundaries of the electrodes. These phenomena increase the apparent impedance of the battery and cause current related heating that may result in failure of internal structures. Extreme cases may result in explosion. Even without damage or danger of explosion, the gasses may require venting and are generally hazardous. Electrolysis may also cause loss of electrolyte which is deleterious to the battery chemistry, causing reduced battery life and increased maintenance costs.

Solid and semi-solid electrolyte batteries are more resistant to leaking, but are still prone to electrolyte degradation. Moreover, such batteries generally have significantly reduced power density and relatively limited number of recharge cycles.

The problems discussed above with respect to different types of batteries can be exacerbated through the use of known charging technologies. For example, both lead-acid and Nickel Metal Hydride batteries can become explosive during rapid charging, especially where the charger does not protect against overcharging.

Battery Chargers

Battery chargers generally fall into two categories—(1) direct current (D.C.) chargers and (2) pulsed current chargers. Direct current chargers typically utilize either a constant voltage mode in which the voltage is fixed and the current varies, or a constant current mode in which the current is fixed and the voltage varies. D.C. chargers give rise to several problems, many of which can be reduced or eliminated by limiting the maximum charging current to a low-value, and thereby extending the charge cycle up to several hours. A typical low-value charging current would be one-tenth battery capacity, i.e., where the charging current falls at the battery's nominal amp-hour capacity divided by 10 hours. Thus, a ten amp-hour battery charging at a rate of 1 amp would employ a low-value charging current. Such chargers, known as trickle chargers, are advantageous in that they obviate the need for complex control schemes, and minimize the danger of reaching an overcharge condition. This is especially true in the constant voltage mode since current will reduce even further as battery voltage approaches the voltage of the charging source. The main drawback of trickle chargers is the inconvenience of being unable to use the battery for the 8 to 18 hours that are required to recharge the battery, or alternatively, the expense of procuring additional battery packs to act as replacements during the recharge cycle. These disadvantages are especially relevant with respect to electric vehicles where the batteries cannot readily be swapped in and out of the vehicle.

In pulsed battery chargers, the charging current is turned on and off periodically, thus allowing gases and separated ions sufficient time to recombine in the electrolyte solution. A further improvement involves utilizing the period of recombination to apply short discharge pulses to the battery to "clean-up" the newly plated material, thereby eliminating contaminants and nodules in the plated matrix. This technique was originally developed and patented by G. W. Jernstedt (assigned to Westinghouse Electric) between 1948 and 1954, and adapted to battery chargers by W. B. Burkett and others (assigned to Christie Electric Corp) around 1971.

An added benefit of pulsed charging is that it allows much higher current density in the charge pulse, which may significantly reduce the charge time. There are practical considerations such as current carrying capacity of the internal battery structure that must be observed, so extremely short charge cycles (less than 0.1 hour) are rarely practical, but still may be possible. Major concern of a high rate charging system centers around when to stop charging, since even a moderate overcharge will cause battery temperature to rise drastically, and can cause explosion. Traditional approaches have been to stay on the safe side and terminate charging well before peak capacity has been achieved. More complex control schemes have been devised (e.g. U.S. Pat. No. 4,746,852 to Martin), but are largely limited to specific battery types where the charge curve is predictable. Many of these approaches depend on further instrumentation of the battery pack through addition of temperature or other sensors. In the case of the example above, identification modules are used to select a specific control mode based upon the signaling of a specific battery type.

It has been known for several years to vary the rate or end-point of battery charging as a function of $0^{th}$, $1^{st}$, $2^{nd}$ and $3^{rd}$ order sense parameters. 0th order sense parameters are those which do not vary over time. Examples include the expected maximum (reference) voltage of a particular type of battery, the maximum safe temperature of the battery during charging, or the maximum safe charging current. 1st order sense parameters are those which do vary over time. Examples include power supply voltage ($V_{ps}$), battery voltage upon application of a given load ($V_{load}$), battery voltage without any load ($V_{unload}$), and the three corresponding currents ($I^{ps}$), ($I_{load}$) and ($I_{unload}$). $2^{nd}$ order sense parameters are time derivatives of the $1^{st}$ order sense parameters, and $3^{rd}$ order parameters are time derivatives of the $2^{nd}$ order parameters. Examples include the $2^{nd}$ order parameter $V'_{ps}$, (which is $dV_{ps}/dt$), and $V''_{ps}$, (which is $dV^2_{ps}/d^2t$).

Known battery chargers have employed relatively simple combinations of $0^{th}$, $1^{st}$, $2^{nd}$ and $3^{rd}$ order sense parameters. For example, chargers are known which modify one or more charging parameters as a function of two different 1st order sense parameters, power supply voltage ($V_{ps}$) and temperature (T), but no second or third order parameters. Other chargers are known which modify one or more charging parameters as a function of one 1st order sense parameters such as temperature (T) and two different 2nd order sense parameters such as $V'_{ps}$ and T''. As used herein, "different sense parameters" means sense parameters which are functionally independent from one another. Thus, multiple time points of the same parameter, such as two temperature measurements at times T1 and T2 would constitute only one sense parameter. Similarly, corresponding voltage and current measurements such as $V'_{ps}$ and $I'_{ps}$, power supply voltage and current, respectively, would constitute only one sense parameter.

Battery Dischargers

Batteries are normally discharged continuously during operation of a motor or other load. In many cases the battery terminals are simply connected to the load through a variable resistor, which in the case of a motor acts as the throttle. Such an arrangement is inherently inefficient because the resistor dissipates electrical power from the battery, especially at relatively small loads.

The inherent inefficiency of resistor control has been addressed for many years by pulsing the current through an electric motor, and varying the duty cycle of the pulses. In most instances the pulse frequency remains constant, and the duty cycle is varied by varying pulse width. In such circumstances, the pulse widths (durations) are directly related to the amount of energy received by the motor, and consequently control the speed of the motor. The longer the pulse width, the greater the speed of the motor.

The switching circuitry in pulsed motor controllers often makes use of silicon control rectifiers (SCRs) and metal oxide semiconductor field effect transistors (MOSFETs). These components, however, are not completely satisfactory, since operation of SCRs and MOSFETs deteriorates in high power applications involving relatively high temperatures. Past attempts to utilize SCRs and MOSFETs in such applications suffered from severe reliability problems.

A significant improvement to this technology is set forth in copending U.S. application Ser. No. 08/437,613, (the '613 application) which is incorporated herein by reference. The '613 application describes a battery discharging circuit which translates a mechanical throttle position into a high frequency voltage, current, or resistance level signal that can be converted by pulse width modulation circuitry into a pulsed wave form. The pulsed wave form signal then drives an array of preferably MOSFET solid state switches to control the flow of current through a DC electric motor. In particularly preferred circuits the signals operate at a frequency greater than 19.4 KHz, and they drive a plurality of parallel buss-mounted MOSFET devices which share the load of the external DC motor. Such circuits may also advantageously incorporate elements that raise the reliability of the overall circuit while still providing versatility in application, including under-voltage as well as over voltage protection and significant levels of signal filtering.

Loads

In most cases the load is already designed to utilize the minimum power required, if only to minimize waste heat. In such instances there may be only minimal benefit in designing the load to cooperate with particular battery systems, chargers and dischargers.

With respect to electric vehicles, however, the situation is somewhat different in that the momentum of the vehicle can be channeled back through either the primary load of the main drive motor, or through an auxiliary braking generators. Many such systems, generically known as regenerative braking systems, are taught in the prior art.

A significant difficulty encountered with known regenerative braking systems, however, is that the brakes may provide the main battery pack with a higher energy density than can be effectively utilized without damage. This problem has not been adequately solved by the prior art because known chargers are inadequate to safely charge known battery packs with sufficient speed to accommodate the power developed by the regenerative braking.

Combinations

Despite the fact that numerous combinations of batteries, battery chargers, battery dischargers and loads are already known, all presently known combinations are thought to be inadequate for commercially feasible self-contained electric cars and other vehicles. Among other problems, the battery charging circuitry is generally too heavy or voluminous to be carried on the vehicle, and manufacturers currently contemplate home or office charging units which can be coupled to a motor vehicle during charging, and then uncoupled during operation of the vehicle.

British patent application, GB 2 087 767 to Robert Bosch GmbH, does describes a circuit which combines a common, on-board, pulsed power source with both a battery and various other loads, but the non-battery loads in that case are small loads such as a stepper motors and illumination lamps. There is clearly neither teaching nor suggestion that a common pulsed power source can be used to drive both a battery and a high power load such as a drive motor.

Thus, there is a strong need to integrate battery, battery charging and battery discharging technologies, along with regenerative braking where applicable, to improve the overall efficiency of battery powered devices, and especially to render electric vehicles more practical by allowing both charger and discharger to be feasibly carried on the vehicles.

SUMMARY OF THE INVENTION

The present invention is directed to battery powered devices, including electric vehicles, where at least one of the loads is a high power load such as a drive motor, and in which both the charging and discharging systems share significant components such as a pulsing subsystem. In particularly preferred embodiments the battery and regenerative braking system (where applicable) are selected to operate efficiently with the charging and discharging systems.

Various objects, features, aspects and advantages of the present invention will become more apparent from the following detailed description of preferred embodiments of the invention, along with the accompanying drawing.

DETAILED DESCRIPTION

Figure 1:
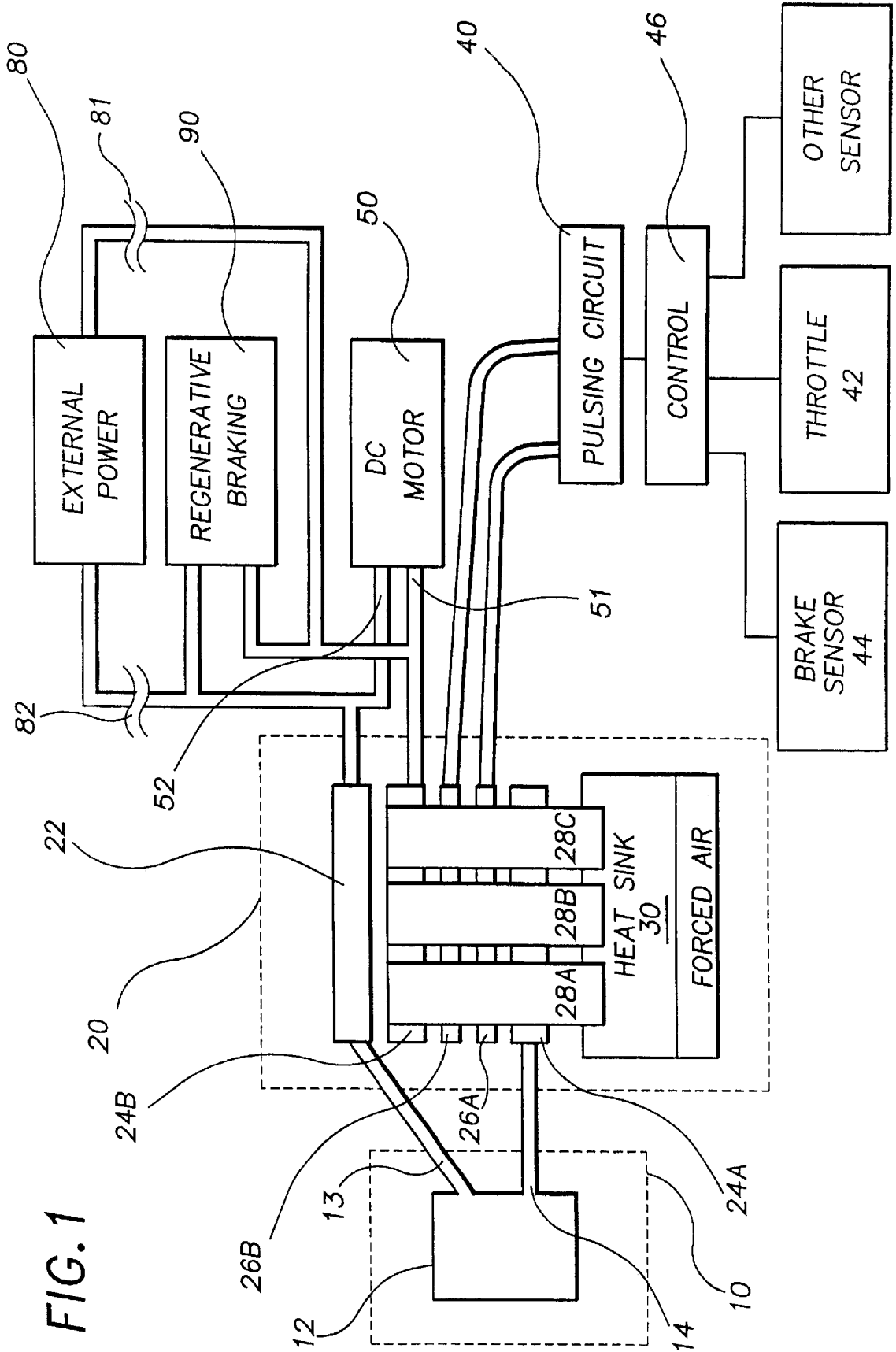
FIG. 1 is a diagram of a preferred embodiment of the present invention.

In FIG. 1 a device such as a motor vehicle (additional details of which are not shown) has a power supply 10, a control system 20, a direct current (DC) electric drive motor 50, a throttle 42 and a regenerative braking system 90.

Batteries 12 can comprise any type of secondary (rechargeable) battery, including common lead acid, Nickel-Cadmium and so forth. Semisolid or solid electrolyte batteries are, however, presently preferred over liquid electrolyte batteries due to safety considerations regarding spillage of electrolyte. Batteries 12 can also comprise either a single battery or a plurality of batteries which are electrically connected to one another. The rated voltage of power supply 10 depends largely upon the application involved. In electric vehicles, power supply 10 may advantageously have a rated voltage of between 120 Volts and 156 Volts, and preferably 144 Volts. This allows the vehicle to be charged using 110–117 Volt AC power from a wall socket without necessitating a transformer, and further allows the battery to be connected to the power grid using small gauge wiring. In other applications such as hand tools or computers, battery 12 would likely have a much lower rated voltage, such as 12 volts or less.

Control system 20 generally includes a power buss line 22, two source/drain (s/d) buss lines 24A, 24B, two gate lines 26A and 26B, one or more power MOSFETs 28A, 28B, and 28C, a heat sink 30, a pulsing circuit 40, and a plurality of sensors such as a throttle sensor 42 and a braking sensor 44. During discharge of the battery 12 to operate the motor 50, one terminal 13 of battery 12 is electrically coupled to a terminal 52 of motor 50 through buss line 22, while the other terminal 14 of battery 12 is coupled to the other terminal 51 of motor 50 through s/d line 24A, power MOSFETS 28A, 28B and 28C, and s/d line 24B. Pulsing circuit 40 provides pulses to gate line 26A under control of a logic or other control circuitry 46, which in turn operates MOSFETS 28A, 28B and 28C to allow current to pass from s/d line 24A to 24B to operate the motor 50. As discussed above, the power delivered by the motor 50 is proportional to the duty cycle of the pulses provided to gate line 26A. The duty cycle can be modified by pulse width or otherwise.

Charging of the battery 12 is accomplished in a similar manner. An external power supply such as an AC power source 80 and/or a regenerative braking power source 90 is electrically coupled to one terminal 13 of the battery 12 through buss line 22, and to the other terminal 14 of the battery 12 through the s/d line 24B, power MOSFETS 28A, 28B and 28C, and s/d line 24A. In this case, however, pulsing circuit 40 provides pulses to gate line 26B, which in turn operates MOSFETS 28A, 28B and 28C to allow current to pass from s/d line 24A to 24B to operate the motor 50. As discussed above, the power delivered by the motor 50 is proportional to the duty cycle of the pulses provided to gate line 26A.

The external power supply 80 will, of course, need to be interruptably coupled to the on-board circuits, and this is shown as connections 81, 82. By matching the operation of the pulsing circuit 40 to properly utilize the inherent frequency of the external power supply, no additional on-board or off-board rectifier is required. Thus, for example, if the pulsing circuit is operating at 19.8 KHz, and the external power supply 80 is providing power at 60 Hz, 330 pulses of the pulsing circuit 40 will correspond to each cycle of current provided by the external power supply 80. Similar matching can take place with respect to the power supplied by the regenerative braking 90, and preferably in such manner that the circuitry automatically compensates for varying frequency of the power produced by the regenerative breaking.

The DC electric drive motor 50 is contemplated to move the motor containing device substantially continuously with respect to an external object Thus, in an electric vehicle motor 50 would provide the motive force to propel the vehicle forward or backward, while in an electric hand tool such as a portable drill or saw, motor 50 would provide the motive force to turn a drill bit or move a saw blade. Under this definition the term "DC electric drive motor" would not include electric motors which are intended to operate only internally, or intermittently, such as a stepper motor used to position a head in a compact diskette (CD) player. Except for those limitations, motor 50 should be interpreted broadly to include motors of virtually any size and power rating, winding configuration and so forth.

It is contemplated that the pulsing circuit 40 will operate at a high frequency—preferably at least 19.4 KHz, and more preferably at least 20 KHz. The wave forms are presently contemplated to be approximately square or triangular, although all other wave forms are contemplated as well.

Thus, while specific embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A battery powered device comprising:

a battery;

a battery control system having a main charging subsystem and a main discharging subsystem, wherein the charging and discharging subsystems share at least one of the following: (a) a duty cycle modulator; (b) a current carrying bus bar; and (3) a transistor heat sink; and a DC electric drive motor.

2. The device of claim 1 wherein the charging and discharging subsystem share at least two of the following: (a) a duty cycle modulator; (b) a current carrying bus bar; and (3) a transistor heat sink.

3. The device of claim 1 wherein the duty cycle modulator produces pulses having varied pulse widths.

4. The device of claim 1 further comprising a battery pack having a rated voltage of between 120 V and 156 V.

5. The device of claim 1 wherein the battery contains a polymer electrolyte.

6. A battery powered device comprising:

a battery;

a battery control system having a main charging subsystem and a main discharging subsystem, wherein the charging and discharging subsystems share at least one of the following: (a) a duty cycle modulator; (b) a current carrying bus bar; and (3) a transistor heat sink; and a DC electric drive motor;

wherein the duty cycle modulator produces pulses at a frequency of at least 19,600 Hz.

7. The device of claim 6 wherein the duty cycle modulator produces pulses at a frequency of at least 20,000 Hz.

8. An electric vehicle comprising:

a battery;

a battery control system having a pulsed on-board main charging subsystem and a pulsed on-board main discharging subsystem, and a DC electric drive motor.

9. An electric vehicle comprising:

a battery;

a battery control system having a pulsed on-board main charging subsystem and a pulsed on-board main discharging subsystem, and a DC electric drive motor;

wherein the duty cycle modulator produces pulses at a frequency of at least 19,600 Hz., with varied pulse widths.

10. The device of claim 9 further comprising a regenerative braking system which generates electrical power upon braking, wherein at least a portion of the electrical power generated thereby is used to charge the battery.

11. The device of claim 10 further comprising a battery pack having a rated voltage of between 120 V and 156 V.

12. A battery powered device comprising:

a battery;

a battery control system having a duty cycle modulator which produces pulses at a frequency of at least 19,600 Hz.; and a DC electric drive motor.

13. The device of claim 12 wherein the battery control system comprises a main charging subsystem and a main discharging subsystem, and the duty cycle modulator is shared by both the charging subsystem and the discharging subsystem.

* * * * *